No. 663,289. Patented Dec. 4, 1900.
E. MEYER.
DRY BATTERY.
(Application filed Nov. 10, 1899.)
(No Model.)

Witnesses
Inventor
Ernest Meyer
By Attorneys

THE NORRIS PETERS CO., PHOTO-LITHO., WASHINGTON, D. C.

UNITED STATES PATENT OFFICE.

ERNEST MEYER, OF PARIS, FRANCE.

DRY BATTERY.

SPECIFICATION forming part of Letters Patent No. 663,289, dated December 4, 1900.

Application filed November 10, 1899. Serial No. 736,473. (No model.)

*To all whom it may concern:*

Be it known that I, ERNEST MEYER, manufacturer, of 60 Boulevard de Clichy, Paris, in the Republic of France, have invented certain new and useful Improvements in Dry Batteries, of which the following is a specification.

The present invention relates to a dry battery characterized by the novel application of peat fiber or moss for storing the exciting liquid in contact with the electrodes. The said battery as established by the present invention is remarkable for the simplicity of its construction, its high efficiency, and its great electromotive power.

Figure 1:
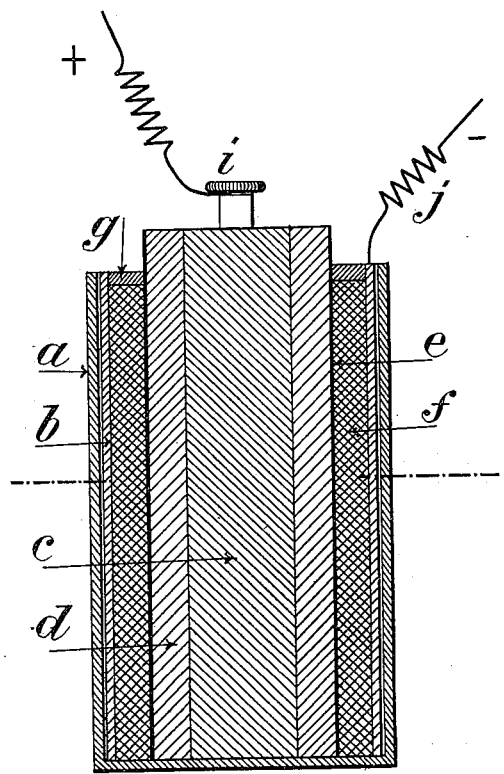
Figure 2:
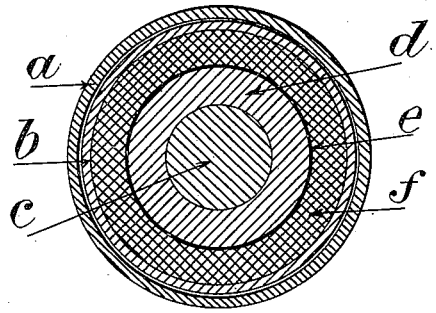

The accompanying drawings represent, by way of example, a vertical section, Figure 1, and a horizontal section, Fig. 2, of my improved dry battery.

The outer casing $a$ may be made of ebonite, hard pasteboard, celluloid, glass, or the like, its shape and dimensions being variable. It is of cylindrical shape in the example shown in the drawings.

The casing $a$ contains a zinc plate $b$ applied against its inner wall through the whole of the extent of its periphery as exactly as possible. The center of the casing is occupied by a carbon $c$, of wedge or cylindrical shape, either with or without wings, or of any other suitable shape and surrounded by a depolarizing mass $d$, which is preferably composed of salt of manganese, graphite, and an alkaline chlorid.

The mass $d$ obtained by means of the above substances suitably crushed, mixed, and agglomerated forms around the carbon $c$ a cylindrical or wedge-shaped envelop or covering surrounded by a linen cloth $e$, fulfilling the purpose of a porous vessel. Between the cloth $e$ and the inner wall of the zinc plate $b$ there remains a more or less regular interval or space, in which is inserted, by means of a spatula or other suitable instrument, the peat fiber or moss $f$, which is suitably compressed. This substance, obtained from vegetable peat or turf carded and washed by any well-known process, possesses special properties which make it particularly proper for use with dry batteries for the purpose claimed by me. Not only is the absorbing power of peat fiber or moss very great, but this product has over the celluloses heretofore used in dry batteries the essential advantage of being absolutely neutral in the presence of the hydrated acids contained in the battery. This neutrality is so complete that there is during the electrochemical working of the battery no formation at all of glucosine through the action of the hydrated acids on the peat fiber or moss. It is known that none of the celluloses heretofore used in the construction of dry batteries possesses this property, which is essential as to the life and the proper working of the battery. The exciting liquid with which the peat fiber or moss is impregnated, after being well pressed down in the space $f$, is preferably composed of chlorid of ammonium and an alkaline chlorid. After complete impregnation of the peat fiber or moss the battery is closed by means of a fluid paste prepared with plaster or other salt of lime so diluted with some of the exciting liquid as to form a sort of lid $g$. The battery after being supplied with the current-takers $i$ and $j$ is then finished.

I claim—

In a dry battery, a centrally-located negative electrode, a depolarizing mass surrounding said electrode, a positive electrode surrounding the depolarizing mass at a distance, a cloth cover on said depolarizing mass, a layer of peat fiber or moss interposed between said cloth cover and the positive electrode and impregnated with an exciting liquid, and a filling of plaster containing some of the exciting liquid, and extending at the top of the battery between the two electrodes.

Signed at Paris, France, this 24th day of October, 1899.

ERNEST MEYER. [L. S.]

Witnesses:
 J. ALLISON BOWEN,
 CAMILLE BLÉTRY.